Patented Dec. 10, 1946

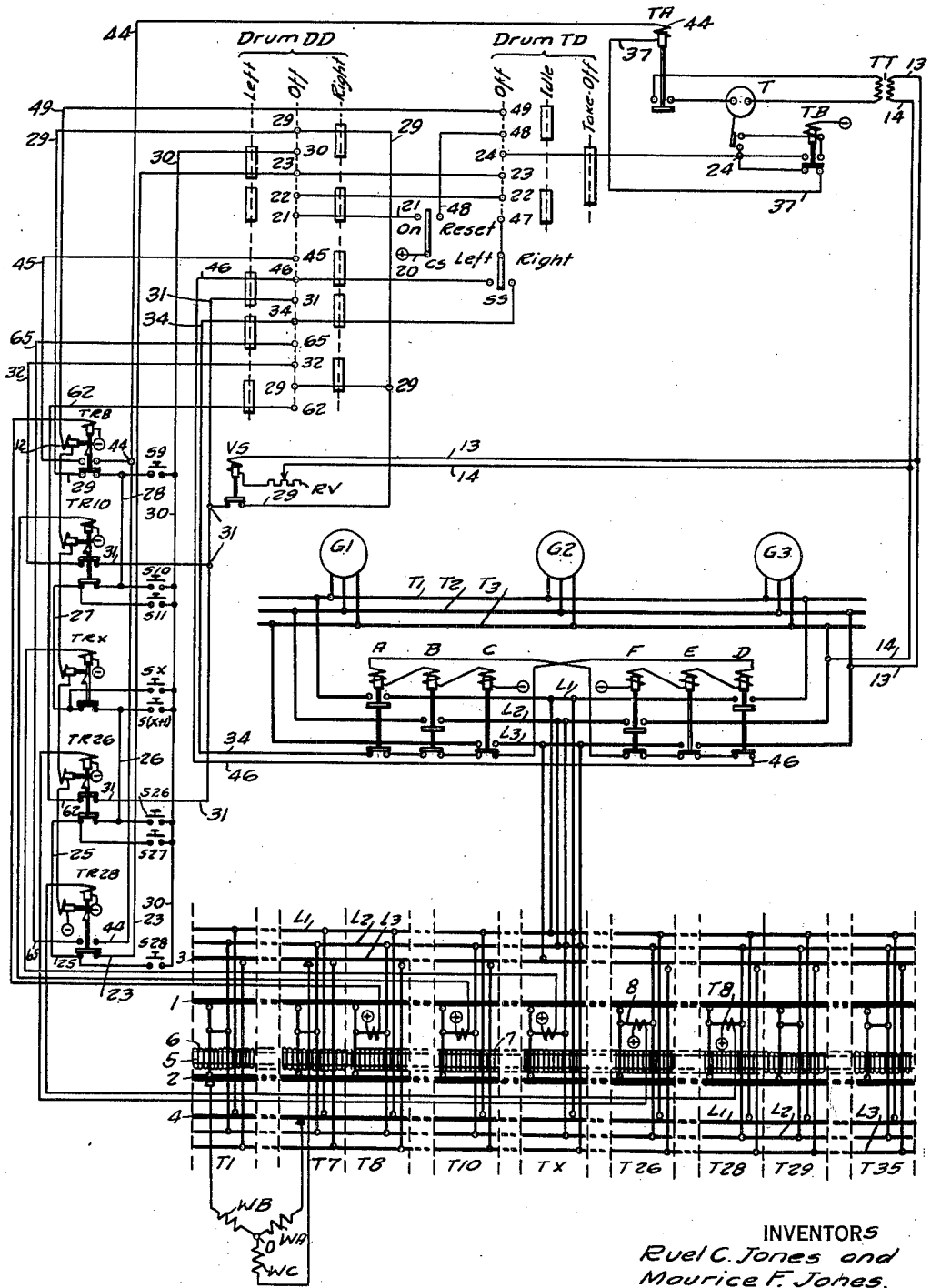

2,412,515

UNITED STATES PATENT OFFICE 2,412,515

CONTROL FOR ELECTRIC CATAPULTS

Ruel C. Jones, Pittsburgh, and Maurice F. Jones, Wilkinsburg, Pa., assignors to Westinghouse Electric Corporation, East Pittsburgh, Pa., a corporation of Pennsylvania Application August 31, 1943, Serial No. 500,640

13 Claims. (Cl. 172—290)

The present invention relates to the control of linear motors and the power plants therefor, in a manner suitable for energizing towing-car catapults for launching aircraft. The general type of apparatus to which the present invention applies constitutes the subject-matter of the description and claims of an application of Frank B. Powers, Serial No. 473,843, filed January 28, 1943, for Electric towing-car catapult for aircraft, assigned to the Westinghouse Electric & Manufacturing Company.

An object of the invention is to provide special transformer-energized track-relays, for cooperating with selector-switches for preselecting the length of the accelerated run of a linear-motor towing-car catapult, so that the length of run may be preselected in accordance with the weight of the plane and the wind-velocity at the moment, without necessitating the utilization of mechanical contact between a stationary switch-arm and a moving part which may be moving at a velocity of 90 miles per hour, or other velocity which is high enough to cause breakage of almost any material which is struck at such a velocity. The control-apparatus is preferably set up so as to provide for either direction of operation of the towing-car. The track-relays are also preferably of a latched or retained-contact type, and they are preferably provided with reset coils which may be energized at the end of each ship-launching operation, after the towing-car has been returned to its starting-point ready for another launching.

A further object of the invention is to provide a voltage-responsive relay at the switchboard, or other means for responding to the attainment of a predetermined and preselected speed of the towing-car, for thereupon automatically and quickly deenergizing the linear motor of the towing-car, so as to terminate its accelerated run. Where a voltage-responsive relay is utilized as the means for responding to the speed of the car, means are preferably provided for by-passing the relay-contacts during the initial portion of the accelerated run of the car, corresponding to the portion of the track which is provided with a high-resistance squirrel-cage winding, because the voltage is likely to be high during this portion of the run, whereas, when the car is over a low-resistance portion of the track, the terminal voltage of the motor is more critically responsive to the motor-speed, particularly at speeds exceeding about half of the full synchronous speed, or some other value. Hence, by adjustments of the pick-up point of the voltage-relay, a preselection can be made as to the car-speed at which the relay operates, at car-speeds varying, for example, between 60 and 90 miles per hour, or other speed-range. Preferably the control is provided so as to be operated for either direction of operation of the towing-car.

With the foregoing and other objects in view, the invention consists in the systems, combinations, apparatus, parts, circuits, and methods, hereinafter described and claimed and illustrated in the accompanying drawing, the single figure of which is a simplified diagrammatic view of circuits and apparatus illustrating the invention in a preferred form of embodiment.

As diagrammatically illustrated in the drawing, an electric catapult involving the present invention includes a linear-motor towing-car, a track therefor, and electrical supply-means and control-means therefor. The towing-car is diagrammatically represented, at the bottom of the figure, by the three-phase primary windings WA, WB, WC of the linear-motor, the winding being illustrated as a star-connected winding having a star-point O.

The track is diagrammatically represented as comprising two track-rails 1 and 2, two third-rails 3 and 4, and a linearly disposed secondary core-member 5 carrying a squirrel-cage secondary-winding, which is represented by the numerals 6 and 7. As described and claimed in an application of Maurice F. Jones, Serial No. 506,197, filed October 14, 1943, the track is preferably fabricated in a plurality of sections T1 to T35, suitably joined together, any desired number of sections being utilized, according to the desired length of run. A certain number of track-sections (seven, as illustrated), at each end of the track, have high-resistance squirrel-cage windings, as indicated by the bent or folded end-connections 6 in the drawing. The large intermediate group of track-sections, represented by the twenty-one sections T8 to T28 in the drawing, have low-resistance squirrel-cage windings, as represented by the low-resistance end-connections 7.

Three-phase electric power is supplied to the track, and thence to the car-motor WA, WB, WC, by means of line-conductors L1, L2, and L3, the specific arrangement of which, to suitably reduce the reactance, which might otherwise be excessively high, being the subject-matter of an application of Maurice F. Jones and Lee A. Kilgore, Serial No. 506,198, filed October 14, 1943. Two of the phases of the power-supply are connected to the third-rails 3 and 4, while the third phase, represented by the line-conductor L2, is connected to the two track-rails 1 and 2, by means of connectors 8, there being a separate connection for each section of track.

Electrical power is supplied to the line-conductors L1, L2, and L3, in the one phase-sequence or the other, by means of two groups of electrically operated power-switches A, B, C and D, E, F. The power-switches A, B, and C energize the car-windings WA, WB, WC in the phase-sequence for operation toward the left, while the power-switches D, E, and F are for acceleration toward the right. The power-switches A, B, C, or D, E, F, supply power to the line-conductors L1, L2, L3 from a three-phase bus T1, T2, and T3.

In the form of embodiment of the invention, as illustrated, three-phase power is supplied to the bus T1, T2, and T3 by means of three generators G1, G2, and G3, or other sources of three-phase power which, in the form illustrated, are advantageously sources of somewhat poor voltage-regulation, so that, when the motor-load is particularly heavy, the voltage drops somewhat.

In accordance with our present invention, twenty-one electrically energized track-relays TR8 to TR28 are provided, one for each of the low-resistance track-sections T8 to T28, these track-relays being energized by current-transformers 8T in the individual track-section leads 8 which supply energy to the track-rails 1 and 2 of the corresponding track-sections. The design is preferably such that any track-relay T*x* will be energized in response to the power-current which is fed into the towing-car at about the time when the center of the towing-car is near the center of the corresponding track-section T*x*, or at any other predetermined point in the travel of the car, responsive to the point, along the track, at which current is being fed into the car at the moment.

Cooperating with the twenty-one track-relays TR8 to TR28 are twenty selector-switches which are diagrammatically illustrated at S9 to S28, these switches being preferably of the retained-contact type, or any type or kind whereby a predetermined one of these switches may be selected and closed by the operator, in order to pre-select the point in the track at which the towing-car will be deenergized, so as to preselect the length of run, in accordance with the weight of the aircraft (not shown) to be launched, with due regard to the prevailing direction and velocity of the wind at the time.

Preferably, the track-relays TR8 to TR28 are of the latched type, or other retained-contact type, so that, when once actuated, each will remain in its actuated position until it has been reset, as by means of a reset coil 12.

In accordance with our invention, a voltage-responsive relay VS is provided, as shown under the drum DD near the upper left-hand corner. The voltage-relay VS is energized from the bus-terminals T2 and T3 through conductors 13 and 14. This voltage-relay VS is designed to pick up and open a back-contact which is sufficiently designated by reference to the relay-designation VS, in response to a predetermined voltage appearing upon the three-phase bus T1, T2, T3. Preferably, means are provided for sensitively adjusting the setting of the voltage-relay VS, as by means of a rheostat RV. The regulation of the current-supply which feeds electrical energy into the bus T1, T2, T3 is such as to be sensitive to the current drawn by the towing-car windings WA, WB, and WC. The voltage-characteristic of the linear-motor of the towing-car is rather flat at the lower car-speeds, but at the higher speeds the current drops more rapidly, and the voltage rises rapidly. By utilizing a sensitive voltage-relay VS, connected across the power-circuit, and calibrated in accordance with the car-speed, the relay may be caused to respond at any pre-selected car-speed in the desired range of from 60 to 90 miles per hour, for example, in a system in which the synchronous car-speed is of the order of 110 miles per hour.

As described and claimed in an application of Ruel C. Jones, Serial No. 500,639, filed August 31, 1943, a timer-relay T is provided, as shown at the upper right-hand portion of the drawing. This relay is energized, through a suitable transformer TT, from the conductors 13 and 14 which are connected to the bus-terminals T2 and T3. The timer-relay T has contacts which can be sensitively adjusted to be closed at the expiration of any pre-selected time after the initial energization of the relay. The energization of the timer-relay T is under the control of an auxiliary relay TA. A second auxiliary relay or contactor-switch TB is controlled by the timer-relay T, at the end of its pre-selected time-setting.

The electrical control equipment for the catapult comprises two control-drums DD and TD, which are shown at the top of the figure, a control-switch CS which is shown between them, and a spotting-switch SS which is shown underneath the drum TD. As indicated, the control-switch has an "on" position and a "reset" position. The drum DD is a direction-selecting drum having an "off" position and two operating positions marked "left" and "right," corresponding to the desired direction of aircraft-launching. The drum TD is a take-off drum which is illustrated as having an "off" position, an "idling" position, and a "take-off" position. The drawing has been simplified by omitting the "test" position and contacts of the drum TD, for testing out the various circuits. The spotting-switch SS can be moved to either the left or the right, according to the direction of acceleration or movement desired to be imparted to the car while it is being returned to its starting point. The two control-drums DD and TD, the control-switch CS, and the spotting-switch SS, cooperate with the power-switches A, B, C and D, E, F to constitute relatively stationarily located control-means, by which we mean that the control-means is stationary or non-movable with respect to the towing-car while the towing-car is movable, without intending to imply that the control-means may not be portable or movable independently of the towing-car.

The operating-control connections may be traced from the control-switch CS. When this switch is in its normal or "on" position, a circuit is completed from the positive terminal of a suitable source of relaying energy, indicated as a positive bus (+), and a conductor 20, to a conductor 21, which is connected to a correspondingly numbered contact-point on the drum DD.

It will first be assumed that the towing-car is at the left-hand end of the track, at or near the track-section T1, and is to be moved to the right for the purpose of accelerating some aircraft (not shown), for the purpose of launching the same. The direction-selecting drum DD is first moved to its right-hand position, to precondition the control-circuits for a right-hand run, and the drum DD will be assumed to be in this position. At the drum DD, the conductor 21 is connected to a conductor 22 which extends to a correspondingly numbered contact-point on the take-off drum TD.

When, now, the signal is given for take-off, the operator moves the take-off drum TD to the "take-off" position, which connects the conductor 22 to the contact-points 23 and 24 of the take-off drum TD. The conductor 23, which is connected to the contact-point 23 of the drum TD, is connected to a correspondingly numbered contact-point of the drum DD, but no contact is made with this point, in the right-hand position of the drum DD. The conductor 23 also extends to a back-contact of the last track-relay TR28, this relay-contact being sufficiently identified by reference to the relay-designation TR28. A relaying circuit is thereupon completed in series through the back-contacts of all twenty-one of the track-relays TR28 to TR8. As only certain illustrative track-relays have been shown, this relaying-circuit can be traced, from the conductor 23 at the relay TR28, through the conductors 25, 26, 27, 28, and 29, and the various relay-contacts, to a correspondingly numbered top contact-point 29 on the drum DD.

A pre-selected one of the selector-switches S9 to S28 also was pre-selected, prior to take-off, the usual interlocks being omitted for the sake of clarity. For purposes of illustration, it will be pressumed that the selector-switch $Sx$ was closed. This makes a bypassing-connection from the conductor 27 of the track-relay TR$x$, through the $Sx$ contact to a conductor 30, which extends to a correspondingly numbered contact-point on the drum DD, where a connection is made to the conductor 29, the drum being in its right-hand position. This bypassing-connection thus short-circuits all of the track-relay contacts which are interposed between the conductor 29 and the conductor 27, so that the relay circuit will not be broken, during the movement of the car, as subsequently described, until the car reaches the track-section T$x$ and energizes the track-relay TR$x$, which will thereupon break the connection between the conductor 23 and the conductor 29.

The conductor 29 continues, from the correspondingly numbered top contact-point of the drum DD to the back-contact of the voltage-relay VS, and thence to a conductor 31. A second circuit is connected from the conductor 29 to a lower contact-point 29 on the drum DD, where a connection is made to a conductor 32 which extends to a second back-contact on the track-relay TR10, which connects this conductor 32 to the conductor 31, until the car has moved as far as the track-section T10, at which point the track-relay TR10 picks up. In this manner, the voltage-responsive and car-speed-responsive relay-contact VS is bypassed until the car reaches the track-section T10 or any other pre-selected track-section which is close to the first section (T8) which has a low-resistance squirrel-cage winding 7, so that the voltage-responsive relay-contact VS is bypassed while the car is on the first seven track-sections T1 to T7 which have a high-resistance squirrel-cage winding 6, which might cause the voltage-switch VS to pick up during this initial portion of the car-run.

The conductor 31 continues on, to a correspondingly numbered contact-point 31 on the drum DD. In its right-hand position, the drum DD connects this conductor 31 to a conductor 34, which extends down to the power-switches D, E, F to energize the same, in series with back-contacts on the power-switches A, B, and C, the circuit being completed at the negative terminal (—) at the operating-coil of the relay F. In this manner, the power-switches D, E, and F are energized, closing their main contacts which energize the leads L1, L2, and L3 from the bus-terminals T1, T3 and T2, respectively, thus energizing the car-winding WA, WB, WC in the phase-sequence suitable for driving the car toward the right. This causes the car to start and to rapidly accelerate in its right-hand run, or the run from its starting point at the track-section T1.

It will be recalled that when the take-off drum TD was first moved to its "take-off" position, it also energized a contact-point 24 from the conductor 22. From the contact-point 24, a conductor 24 extends to the back-contact of the TB relay; and thence to a conductor 37.

As described and claimed in the application of Ruel C. Jones, Serial No. 500,639, another circuit from the conductor 37 extends to the operating coil of the other auxiliary timer-relay TA, and thence to a conductor 44, which is connected to a make-contact of the first track-relay TR8, corresponding to the first track-section T8 having a low-resistance squirrel-cage winding 7. At an early part of the run of the towing-car, when it reaches the track-section T8, the track-relay TR8 picks up, and connects the conductor 44 to a conductor 45 which leads to a correspondingly numbered contact-point on the drum DD, where this conductor is connected to a conductor 46. The conductor 46 leads down to the left-hand, or reversing, power-switches A, B, and C, through back-contacts of the right-hand, or ship-launching, power-switches D, E, and F.

Thus, at an early stage in the movement of the towing-car, a partial relaying-circuit is set up, energizing the reversing power-switch conductor 46 from the positive relaying-bus (+), starting with the conductor 20 at the control-switch CS, and extending through the contact-point 24 of the take-off drum TD. The reverse-phase-sequence power-switches A, B, and C are not immediately energized, however, because the other three power-switches D, E, and F had previously been energized in order to cause the car to move toward the right along the track.

The right-hand power-switches D, E, and F are deenergized, in general, either in response to the selector-switch selection $Sx$, which pre-selects the length of car-run, or in response to the car-speed-responsive voltage-switch VS, which corresponds to a pre-selected value of the car-speed. As soon as all three of the right-hand power-switches D, E, and F are open, the previously partially energized relaying-circuit 46 comes into play, to instantly energize the three left-hand power-switches A, B, and C, so as to immediately apply power to the car in the reverse phase-sequence, producing a force tending to move the car toward the left.

The energization of the left-hand, or reversing, power-switches A, B, and C causes current to flow through the operating-coil of the first auxiliary timing-relay TA, because this operating-coil is connected between the conductors 37 and 44. This picks up the first auxiliary timing-relay TA, which, as described and claimed in the application of Ruel C. Jones, Serial No. 500,639, energizes the timer T, thus initiating the movement of the timer T, which, at the end of a pre-selected timeinterval, will close its contact and energize the auxiliary timing-relay TB.

The reverse-phase-sequence energization of the towing-car continues, in general, until the expiration of the pre-selected time-period of the timer T, at which time the auxiliary timing-relay TB picks up, seals itself in, and breaks the contact between the conductors 24 and 37. The timer T is set to discontinue the reversed excitation of the car-motor WA, WB, WC before the car attains a high velocity in its return-trip to its starting point, and it serves as a sort of back-up protection to safeguard against a too fast return-trip. Since the reversing power-switch conductor 46 is energized from the conductor 37, the breaking of the circuit at 24—37 results in deenergizing the reversing power-switches A, B, and C, thus deenergizing the towing-car, and leaving it coasting back towards its starting point.

As soon as the towing-car commences its return-journey, the operator at the take-off drum TD should immediately move said drum to the "idle" position thereof. This does several things. It deenergizes the conductors 24—37, from which the reversing power-switch conductor receives its energization. However, the reversing power-switches A, B and C are already deenergized, as described. The "idle" drum-position energizes a contact-point 47 of said drum TD, from the conductor 22, thereby energizing the spotting-switch SS. It also connects two other contact-points 48 and 49 of the aforesaid drum TD to each other, thus electrically connecting the correspondingly numbered conductors 48 and 49.

To bring the car to a standstill, at the starting-point, at the precise spot desired, the spotting-switch SS is utilized. The car is now moving to the left toward the starting-point. To brake the car, the spotting-switch SS is moved to the right, connecting the conductor 47 to the conductor 34 which energizes the power-switches F, E, D. This applies a small braking-force to the car, and this braking-force is discontinued, at any moment desired, by returning the spotting-switch to its central or neutral position. If the spotting-switch should be left too long on its right-hand position, so that the car starts back again toward the right, the spotting-switch may be touched momentarily on its left-hand position, connecting the conductor 47 to the conductor 46, which momentarily energizes the power-switches A, B, and C.

In the "idling" position of the take-off drum TD, it has been noted that the conductor 48 is joined to the conductor 49. The conductor 48 is connected to the "reset" position of the control-switch CS, so that, after the car has been brought, with the spotting-switch SS, to its desired position, at either end of the track, the control-switch CS can be moved from its "on" position momentarily to its "reset" position, thus momentarily energizing the conductor 48 from the conductor 20 and the positive relaying-bus (+). The conductor 48 is connected, in the "idling" position of the take-off drum TD, to the conductor 49, which energizes all of the reset coils 12 in series, thereby resetting all of the track-switches TR8 to TR28. As soon as these relays are reset (which takes but a moment), the control-switch CS is returned to its "on" position, ready for another launching.

In the preceding explanation, it has been assumed that the car started from track-section T1 and operated toward the right. An important feature of the design, however, is that the car can be operated for take-off in either direction, with equal facility.

Thus, if the car should initially be standing at the other end of the track, or on the track-section T35, so that it would be necessary to take off in a direction toward the left, the direction-selecting drum DD would be moved first to the "left" position. The effect of this drum-setting would be as follows. The contact-point 21 would again be connected to the contact-point 22. The contact-point 30 would be connected to the contact-point 23 rather than the upper contact-point 29. The lower contact-point 29 would be connected to a conductor 62, rather than the conductor 32. The contact-point 34 would be connected to a conductor 65, instead of the conductor 31, and the contact-point 46 would be connected to the conductor 31 instead of the conductor 45.

The changing of the conductor 30 from contact with the conductor 29 to contact with the conductor 23 results in making the selected selector-switch, such as S(x+1), shortcircuit the back-contacts of the track-relays between TRx and the conductor 23, rather than between TRx and the conductor 29, so that the conductor 29 remains energized until the selected track-relay TRx is actuated, whereupon the conductor 29 is deenergized, and the accelerating movement of the towing-car is discontinued.

The effect of connecting the lower contact-point 29 to the conductor 62, rather than the conductor 32, will be observed by noting that the conductor 62 extends to an auxiliary back-contact of the track-relay 26, and thence to the conductor 31, so that the back-contact of the voltage-relay VS is now shunted by the track-relay 26 rather than the track-relay 10. Otherwise, the operation is the same as described for the right-hand car-travel, it being understood that the track-relay TR26 bears the same relation to the car-movement in the left-hand direction, as the track-relay TR10 during the right-hand movement of the car.

The effect of connecting the contact-point 46 to the conductor 31 instead of the conductor 45 is to make the initial energization of the power-switches an energization of the switches A, B, and C for left-hand operation, under the control of the conductor 31, thus setting up the control-circuits for operation of the car in the left-hand direction.

The effect of connecting the conductor 34 to the conductor 65 instead of the conductor 31 will be seen from observing that the conductor 65 is connected to a make-contact of the track-relay TR28, which corresponds to the first track-section T28 having a low-resistance squirrel-cage winding 7 to be encountered by the car, in its travel toward the left. When the track-relay TR28 picks up, it thus closes its make-contact and connects the conductor 65 to the conductor 44, thus setting up a partial energizing-circuit, through the coil of the auxiliary timing-relay TA, from the conductor 37 to the conductor 44, thence to the conductor 65, and thence to the conductor 34, which is ready to energize the right-hand power-switches D, E, F as soon as the left-hand power-switches A, B, and C drop out.

Since the operation of the apparatus has been carefully described, in the process of the description, it is believed that no further summary of the operation is necessary. While a single form of embodiment of the invention has been illustrated, it is to be understood that the invention is not limited, in its broader aspects, to any particular form of embodiment, as many changes of addition, omission, and substitution may be made, without departing from the essential features of the invention. It is desired, therefore, that the appended claims shall be accorded the broadest construction consistent with their language.

We claim as our invention:

1. An electrically controlled system, comprising a self-propelling polyphase-motored movable body, a multi-sectional track therefor, power-feeder means for feeding polyphase electrical energy to said polyphase-motored movable body, at least one phase of said electrical energy being fed to various sections of the track and thence to the polyphase-motored movable body, a plurality of position-responsive means, associated with a plurality of sections of said track, for responding to the position of the polyphase-motored movable body on different sections of the track, each position-responsive means being energized in response to the flow of electrical energy into its corresponding track-section, and a relatively stationarily located control-means for controlling the energization of the polyphase-motored movable body and for preselecting one or more position-responsive means for utilization in such control.

2. An electrically controlled system, comprising a reversible self-propelling polyphase-motored movable body, a multi-sectional track therefor, power-feeder means for feeding polyphase electrical energy to said polyphase-motored movable body, at least one phase of said electrical energy being fed to various sections of the track and thence to the polyphase-motored movable body, a plurality of position-responsive means, associated with a plurality of sections of said track, for responding to the position of the polyphase-motored movable body on different sections of the track, each position-responsive means being energized in response to the flow of electrical energy into its corresponding track-section, a relatively stationarily located, electrically controlled, power-switch means for controlling the polyphase energization of the polyphase-motored movable body in either sequence of phases, control-switch means, associated with said power-switch means, for initiating the forward-driving polyphase energization of said polyphase-motored movable body for a forward run in a selected phase-sequence, control-means for rendering effective a preselected position-responsive means, for predetermining the length of the forward-driven run of the polyphase-motored movable body, and control-switch means, associated with said power-switch means, for discontinuing said forward-driving polyphase energization of the polyphase-motored movable body in response to said preselected position-responsive means.

3. An electrically controlled system, comprising, a self-propelling polyphase-motored movable body, a multi-sectional track therefor, power-feeder means for feeding polyphase electrical energy to said polyphase-motored movable body, at least one phase of said electrical energy being fed to various sections of the track and thence to the polyphase-motored movable body, a plurality of track-relays, associated with a plurality of sections of said track, for responding to the position of the polyphase-motored movable body on different sections of the track, the track-relays being of the retained-contact type and having reset-coils, means for energizing each track-relay in response to the flow of electrical energy into its corresponding track-section, a relatively stationarily located control-means for controlling the energization of the polyphase-motored movable body and for preselecting a particular track-relay or track-relays for utilization in such control, and control-means for at times energizing said reset-coils.

4. An electrically controlled system, comprising a self-propelling polyphase-motored movable body, power-feeding means for supplying the polyphase-motored movable body with polyphase energy in such manner that the voltage is subject to perceptible variation in response to the current drawn by said polyphase-motored movable body, a relatively stationarily located control-means for initiating the forward-driving polyphase energization of said polyphase-motored movable body for a forward run in a selected phase-sequence, and voltage-responsive means for terminating said forward-driving polyphase energization of the polyphase-motored movable body in response to the voltage of said polyphase energy.

5. The invention as defined in claim 4, in combination with means, operative during the initial portion of the forward run of the polyphase-motored movable body, for rendering the voltage-responsive means ineffective to terminate the forward-driving polyphase energization of the polyphase-motored movable body.

6. An electrically controlled system, comprising a reversible self-propelling polyphase-motored movable body, a track therefor, power-feeder means for supplying the polyphase-motored movable body with polyphase energy in such manner that the voltage is subject to perceptible variation in response to the current drawn by said polyphase-motored movable body, a relatively stationarily located, electrically controlled, power-switch means for controlling the polyphase energization of the polyphase-motored movable body in either sequence of phases, control-switch means, associated with said power-switch means, for initiating the forward-driving polyphase energization of said polyphase-motored movable body for a forward run in a selected phase-sequence, voltage-responsive means, associated with said power-switch means, for terminating said forward-driving polyphase energization of the polyphase-motored movable body in response to the voltage of said polyphase energy, a track-relay for responding to the position of the polyphase-motored movable body close to, but removed from, the starting point of said forward run, and means, operative only prior to a response of said track-relay, for rendering the voltage-responsive means ineffective to terminate the forward-driving polyphase energization of the polyphase-motored movable body.

7. An electrically controlled system, comprising a reversible self-propelling polyphase-motored movable body, a track therefor, power-feeder means for supplying the polyphase-motored movable body with polyphase energy in such manner that the voltage is subject to perceptible variation in response to the current drawn by said polyphase-motored movable body, a relatively stationarily located, electrically controlled, power-switch means for controlling the polyphase energization of the polyphase-motored movable body in either sequence of phases, control-switch means, associated with said power-switch means, for initiating the forward-driving polyphase energization of said polyphase-motored movable body for a forward run in a selected phase-sequence, a plurality of position-responsive means for responding to the position of the polyphase-motored movable body on different portions of the track, control-means for preselecting the phase-sequence to be used for said forward-driving polyphase energization of the polyphase-motored movable body and for also preselecting a particular position-responsive means, dependent upon the direction of the forward run, voltage-responsive means, associated with said power-switch means, for terminating said forward-driving polyphase energization of the polyphase-motored movable body in response to the voltage of said polyphase energy, and means, operative only prior to a response of said preselected position-responsive means, for rendering the voltage-responsive means ineffective to terminate the forward-driving polyphase energization of the polyphase-motored movable body.

8. An electrically controlled system, comprising a reversible self-propelling polyphase-motored movable body, a multi-sectional track therefor, power-feeder means for supplying the polyphase-motored movable body with polyphase energy in such manner that the voltage is subject to perceptible variation in response to the current drawn by said polyphase-motored movable body, at least one phase of said electrical energy being fed to various sections of the track and thence to the polyphase-motored movable body, a plurality of position-responsive means, associated with a plurality of sections of said track, for responding to the position of the polyphase-motored movable body on different sections of the track, each position-responsive means being energized in response to the flow of electrical energy into its corresponding track-section, a relatively stationarily located, electrically controlled, power-switch means for controlling the polyphase energization of the polyphase-motored movable body in either sequence of phases, control-switch means, associated with said power-switch means, for initiating the forward-driving polyphase energization of said polyphase-motored movable body for a forward run in a selected phase-sequence, control-means for preselecting the phase-sequence to be used for said forward-driving polyphase energization of the polyphase-motored movable body and for also preselecting a particular position-responsive means, dependent upon the direction of the forward run, voltage-responsive means, associated with said power-switch means, for terminating said forward-driving polyphase energization of the polyphase-motored movable body in response to the voltage of said polyphase energy, and means, operative only prior to a response of said preselected position-responsive means, for rendering the voltage-responsive means ineffective to terminate the forward-driving polyphase energization of the polyphase-motored movable body.

9. An electrically controlled linear-motor system, comprising a track having a linearly disposed secondary core-member carrying a squirrel-cage secondary-winding which is of high resistance at an initial portion of the track and of a low resistance at a subsequent portion thereof, a polyphase-wound primary member operative on said track, power-feeder means for supplying the primary member with polyphase energy in such manner that the voltage is subject to perceptible variation in response to the current dawn by said primary member, a relatively stationarily located control-means for initiating the forward-driving polyphase energization of the primary member for a forward run thereof, voltage-responsive means for terminating said forward-driving polyphase energization of the primary member in response to the voltage of said polyphase energy, and means operative during the initial portion of said forward run, while the primary member is on the high-resistance portion of the track, for rendering the voltage-responsive means ineffective to terminate the forward-driving polyphase energization of the primary member.

10. An electrically controlled linear-motor system, comprising a track having a linearly disposed secondary core-member carrying a squirrel-cage secondary-winding which is of high resistance at an initial portion of the track and of a low resistance at a subsequent portion thereof, a polyphase-wound primary member operative on said track, power-feeder means for supplying the primary member with polyphase energy in such manner that the voltage is subject to perceptible variation in response to the current drawn by said primary member, a relatively stationarily located control-means for initiating the forward-driving polyphase energization of the primary member for a forward run thereof, voltage-responsive means for terminating said forward-driving polyphase energization of the primary member in response to the voltage of said polyphase energy, a track-relay for responding to the position of the primary member on the initial low-resistance portion of the track, at a point close to, but removed from, the starting point of said forward run, and means, operative only prior to a response of said track-relay, for rendering the voltage-responsive means ineffective to terminate the forward-driving polyphase energization of the primary member.

11. An electrically controlled system, comprising a self-propelling polyphase-motored movable body, a track therefor, a plurality of third-rails associated with the track, a plurality of spaced feeder-means for feeding polyphase energy into the track and the third-rails at a plurality of spaced points along the track, means on the polyphase-motored movable body for collecting polyphase energy from the third-rails and from the track, a plurality of position-responsive means, associated with a plurality of said spaced feeder-means, for responding to the flow of electrical energy through the respective feeder-means, and a relatively stationarily located control-means for controlling the energization of the polyphase-motored movable body and for preselecting one or more position-responsive means for utilization in such control.

12. An electrically controlled system, comprising a self-propelling polyphase-motored movable body, a track therefor, a plurality of third-rails associated with the track, a plurality of spaced feeder-means for feeding polyphase energy into the track and the third-rails at a plurality of spaced points along the track, means on the polyphase-motored movable body for collecting polyphase energy from the third-rails and from the track, a plurality of position-responsive means, associated with a plurality of said spaced feeder-means, for responding to the flow of electrical energy through the respective feeder-means, a relatively stationarily located, electrically controlled power-switch means for controlling the polyphase energy-supply to the track and the third-rails through said feeder-means, control-means for rendering a preselected position-responsive means effective, control-means for actuating said power-switch means to provide a forward-driving polyphase energization for the polyphase-motored movable body, and control-switch means, responsive to the preselected position-responsive means, for discontinuing said forward-driving polyphase energization of the polyphase-motored movable body.

13. An electrically controlled system, comprising a reversible self-propelling polyphase-motored movable body, a track therefor, a plurality of third-rails associated with the track, means on the polyphase-motored movable body for collecting polyphase energy from the third-rails and from the track, energy-supply means including a plurality of spaced feeder-means for feeding polyphase energy into the track and the third-rails at a plurality of spaced points along the track, and thence to the polyphase-motored movable body, in such manner that the voltage is subject to perceptible variation in response to the current drawn by said polyphase-motored movable body, a plurality of position-responsive means, associated with a plurality of said spaced feeder-means, for responding to the flow of electrical energy through the respective feeder-means, a relatively stationarily located control-means for initiating the forward-driving polyphase energization of said polyphase-motored movable body for a forward run in a selected phase-sequence, control-means for preselecting the phase-sequence to be used for said forward-driving polyphase energization of the polyphase-motored movable body and for also preselecting a particular position-responsive means, dependent upon the direction of the forward run, voltage-responsive means for terminating said forward-driving polyphase energization of the polyphase-motored movable body in response to the voltage of said polyphase energy, and means operative only prior to a response of the preselected position-responsive means, for rendering the voltage-responsive means ineffective to terminate the forward-driving polyphase energization of the polyphase-motored movable body.

RUEL C. JONES.
MAURICE F. JONES.